United States Patent [19]
Young

[11] Patent Number: 5,280,504
[45] Date of Patent: Jan. 18, 1994

[54] ZIRCONIUM ALLOY TUBE WITH A BORON-CONTAINING LAYER

[75] Inventor: Richard H. Young, Canton, Conn.

[73] Assignee: Combustion Engineering, Inc., Windsor, Conn.

[21] Appl. No.: 906,378

[22] Filed: Jun. 30, 1992

[51] Int. Cl.⁵ .................................................. G21C 3/00
[52] U.S. Cl. ..................................... 376/419; 376/457; 376/414
[58] Field of Search ............... 376/419, 414, 416, 339, 376/457; 976/DIG. 52, DIG. 44, DIG. 53, DIG. 116, DIG. 117; 252/636, 629

[56] References Cited

U.S. PATENT DOCUMENTS

| | | | |
|---|---|---|---|
| 3,892,882 | 7/1975 | Guest et al. | 427/34 |
| 4,609,524 | 9/1986 | Ferrari | 376/417 |
| 4,610,893 | 9/1986 | Eriksson et al. | 427/34 |
| 4,683,114 | 7/1987 | Ho et al. | 376/419 |
| 4,818,477 | 4/1989 | Chubb | 376/419 |
| 4,824,634 | 4/1989 | Fuhrman et al. | 376/419 |
| 4,880,597 | 11/1989 | Bryan et al. | 376/419 |
| 4,919,335 | 4/1990 | Hobson et al. | 239/3 |
| 5,109,150 | 4/1992 | Rogers | 219/121.47 |

OTHER PUBLICATIONS

A Guide to Nuclear Power Technology, pp. 429-438, 1984.

*Primary Examiner*—Donald P. Walsh
*Assistant Examiner*—Meena Chelliah
*Attorney, Agent, or Firm*—Ronald P. Kananen; John H. Mulholland

[57] ABSTRACT

A fuel rod for a nuclear reactor is described. The fuel rod contains a zirconium alloy cladding tube, with a thin coating of a burnable poison which has been plasma-arc sprayed on the inside diameter of the cladding tube. Also described is a plasma-arc spraying device and a method for applying a coating to the inside of a small-diameter metal tube.

25 Claims, 2 Drawing Sheets

ZIRCONIUM ALLOY TUBE WITH A BORON-CONTAINING LAYER

FIELD OF THE INVENTION

This invention relates to fuel rods for use in a nuclear fuel assembly which have a burnable-poison coating disposed on the inside surface of the fuel rod cladding tube. More particularly, this invention relates to a fuel rod cladding tube having an internal burnable-poison coating which consists of zirconium diboride or other boroncontaining material comprising naturally occurring boron or isotopically enriched boron-10. This invention also relates to a method and apparatus for applying a ceramic or metal coating on the inside of a small-diameter tube. More particularly, this invention relates to a method and apparatus for plasma-arc spraying a ceramic or metal layer on the inside of the tube.

BACKGROUND OF THE INVENTION

General background materials on fuel rods, claddings and absorber materials are available. See, e.g., Frank J. Rahn et al., *A Guide to Nuclear Power Technology*, pp. 429–438 (1984).

In light water reactor (LWR) designs, fuel is formed into oxide pellets, which consist of uranium oxide or mixed uranium/plutonium oxide. These pellets are then placed in long tubes called cladding tubes to form fuel rods. The cladding tube forms a barrier against radioactive fission products released in the fuel pellets during irradiation. Proper fuel design requires an economical fuel cycle, while providing the necessary fuel characteristics for safe plant operation. Thus structural materials must be selected that have low neutron cross-section and low cost, while providing adequate mechanical and corrosion resistance characteristics. Fuel assembly design should accordingly allow for the operation of the reactor at the design power and for the highest possible burn-up without breaching the cladding and releasing radioactive products to the primary coolant.

Zirconium alloys are used in fuel designs because they combine desirable nuclear, physical and mechanical properties. Because nuclear-grade zirconium is expensive, its alloys are used only in the active zone of the nuclear core where its neutron economy is most advantageous. Zircaloy-2 and Zircaloy-4 are two slightly different alloys which were developed for nuclear applications. Zircaloy-2 typically contains about 1.4 wt % tin, 0.15 wt % iron, 0.1 wt % chromium and 0.06 wt % nickel, 1,000 ppm oxygen and the balance zirconium. Zircaloy-4 typically contains about 1.4 wt % tin, 0.21 wt % iron, 0.11 wt % chromium, 30 ppm nickel, 1,200 ppm oxygen and the balance zirconium. Zircaloy-2 has a small content of nickel, while in Zircaloy-4 the nickel content is essentially replaced by iron. This small change in composition reduces the hydrogen absorption rate during service in high-temperature water. The physical and mechanical properties of the two alloys are nearly identical. Pressurized water reactor (PWR) fuel rods are typically made with Zircaloy-4 cladding, while boiling water reactor (BWR) fuel rods utilize Zircaloy-2.

Continuous operation of a reactor requires that the core remain critical. However, to compensate for the gradual depletion of fissile material with time, as burn-up accumulates, and to compensate for other phenomena such as the buildup of fission products, excess reactivity must be built into the nuclear core. This excess reactivity, however, must be controlled at any given time to keep the reactor critical for steady-state operation. This task is accomplished by the use of materials that are strong neutron absorbers or "poisons." Control elements constructed from neutron absorbers regulate power generation according to demand, provide quick shutdown, account for short-term and long-term reactivity changes that result from temperature changes, and adjust for fission product accumulation and fissile material depletion.

The foremost characteristic of a control material is its neutron absorption properties. These vary with the energy of the impinging neutrons but one can gather together the detailed absorption features into a "thermal absorption cross-section," which is of interest in LWR's. The dominant absorber used in control rods in LWR's is boron.

In addition to the movable control rods used in all LWR's, present LWR designs utilize burnable poisons. These are solid neutron absorbers which are placed in the reactor. As it is subjected to neutron irradiation, the burnable absorber material is gradually depleted. Thus the depletion of the burnable poison corresponds, roughly, to the depletion of fissile material. Burnable-poisons are used to counterbalance excess reactivity at the beginning of the fuel cycle and to provide a means for power shaping and optimum core burn-up. Burnable poison compounds currently of interest include erbium, gadolinium and boron.

LWR fuel designs employ burnable absorber rods to control power peaking or moderator temperature coefficient in a number of ways. In some designs, burnable absorber rods are placed in fuel assembly lattice locations, thereby displacing fuel rods. Other designs employ burnable absorber rod inserts and fuel assembly guide thimbles. Still other designs involve the formation of burnable-absorber coatings on the inside diameters of cladding tubes, on fuel pellet surfaces, or involve distribution of the burnable absorber within the fuel pellet.

The use of a burnable-poison which is provided on the inside surface of the fuel cladding tube has several advantages. For example, such a configuration can be used with uranium dioxide fuel pellets provided inside the cladding so that the fuel rod produces as much (or almost as much) power as a regular fuel rod.

Moreover, the burnable-poison can be applied to the cladding tube prior to the introduction of the uranium dioxide pellets into the tube, allowing the burnable-poison to be applied to the cladding in a cold (non-nuclear) area. This allows the burnable-poison to be applied by the tubing fabricator or by the fuel-rod fabricator and reduces the costs associated with the manufacture of the cladding tubes containing the burnable poison.

Furthermore, when the burnable poison is applied to the inside of the fuel cladding tubes, it is relatively easy to adjust the axial gradient of the burnable poison. This provides an advantage over associated methods which involve putting burnable poison on the pellet and mixing pellet types.

Finally, the use of cladding tubes having a burnable-poison layer provides for improved quality control. For example, the burnable-poison coating depth can be accurately determined by bombarding the tubing with neutrons and measuring the fraction of the neutrons which are not absorbed by the burnable poison.

It is proposed that plasma-arc spraying be used to apply the burnable poison to the inside of the fuel cladding tube. The plasma-arc spray-coating process is used to provide a securely bonded layer which will resist abrasion or spalling. The plasma-arc spray-coating has not been used to deposit a burnable poison coating on the inside diameter of fuel rod cladding tubes. Moreover, it is anticipated that fuel cladding tubes of extremely small diameter (i.e., approximately ⅜ inch) will be used. The inside diameter of such tubes have apparently never been plasma-arc spraycoated prior to the present invention for either nuclear or non-nuclear use.

SUMMARY OF THE INVENTION

In view of the foregoing, it is an object of the present invention to provide a zirconium alloy fuel rod cladding tube having a burnable-poison which has been plasma-arc spray-coated on the inside surface.

As a further object of the invention, the burnable poison is preferably naturally occurring boron or isotopically enriched boron-10. For a ⅜ inch rod, the boron coating may be provided in a thickness on the order of 0.0002 inches for naturally occurring boron and in a thickness on the order of 0.00004 inches for boron-10.

It is another object of the present invention to provide a method for depositing a ceramic or metal coating on the inside surface of a small tube using a plasma arc spraying technique. Accordingly, an electrical potential is applied across an inert atmosphere between an electrode and a tubular member such that an electrical arc is established between the electrode and the inner surface of the tubular member. A burnable-poison-containing powder is then entrained in an inert atmosphere and provided in the vicinity of the arc. At the same time, the electrode is rotated and axially moved with respect to the tubular member while maintaining a predetermined spacing from the tubular member.

It is yet a further object of the present invention to provide a plasma-arc spray-head device for depositing a ceramic or metal coating on the inside surface of a small tube. Thus, a device is provided comprising an annular ceramic housing having an aperture; an electrically conductive member disposed within the housing; an electrode in electrical contact with the electrically conductive member, the electrode being disposed such that it projects into the aperture in the ceramic housing and extends outwardly to a first maximum radius which is less than a second maximum radius corresponding to the outermost radial extent of the plasma-arc spray-head device; and means for supplying a gaseous composition to the vicinity of the electrode.

DESCRIPTION OF THE PREFERRED EMBODIMENTS

Figure 1:
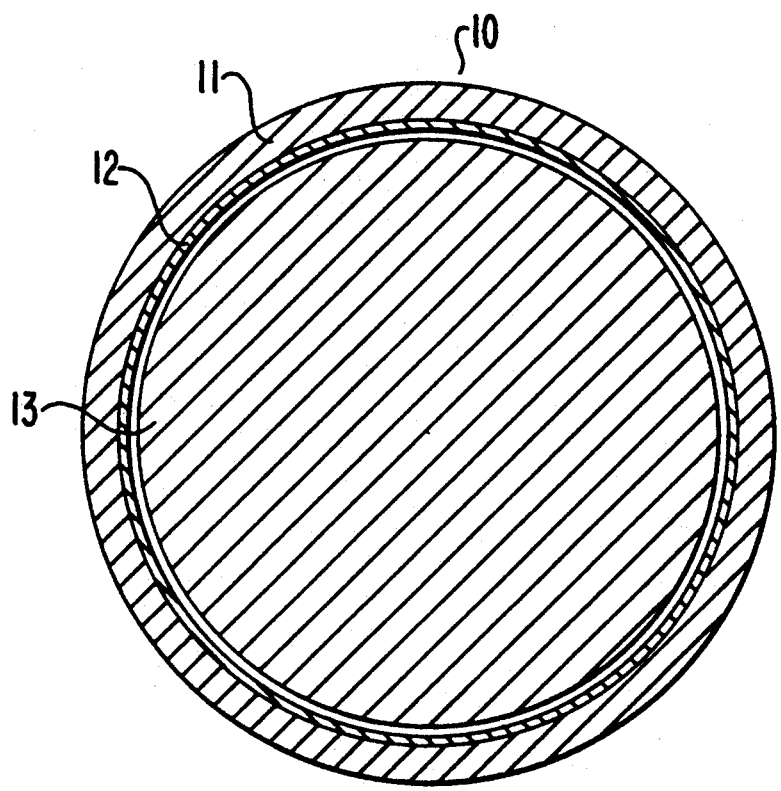
FIG. 1 is a cross-sectional view of a fuel rod according to an embodiment of the present invention.

The present invention relates to the fabrication of an improved fuel rod having a burnable-poison coating that is resistant to spalling and maintains a high coating integrity.

Burnable poison materials of current interest include boron, gadolinium and erbium. While the preferred embodiments of the present invention use boron as a burnable poison, it should be understood that other burnable poisons may be appropriate, depending on the specific application. Naturally occurring boron includes roughly 20% boron-10 ($B^{10}$) and 80% boron-11. (Bn). Boron-10, however, has a thermal absorption cross-section that is orders of magnitude greater then boron-11. Thus, the use of isotopically purified boron-10 will minimize the thickness of the burnable poison coating. Eagle-Picher Industries, Inc., Quapaw, Okla, 74363, enriches the boron by a process of fractional distillation. Boron trifluoride $BF_3$ dimethylether complex is dissociated in a fractional distillation column. $B^{11}F_3$ reassociates more readily so that $B^{11}$ concentrates in the vapor phase and $B^{11}$ concentrates in the liquid phase. Varying degrees of enrichment of $B^{10}$ can thus be produced by the Eagle-Picher process. Another method for enriching the boron of the boron-containing compound is by atomic vapor laser isotope separation (AVLIS). AVLIS was developed for large scale uranium enrichment applications at the Lawrence Livermore National Laboratory. AVLIS works by first heating and vaporizing a sample of interest followed by laser irradiation at a wavelength specifically selected to ionize only the selected isotope. Once ionized, the isotope is isolated using electric fields. Other separation methods include gas diffusion, centrifugal separation and liquid chromatography.

According to an embodiment of the present invention, the burnable-poison coating is a ceramic or metal composition which is selected to bond securely to a zirconium alloy surface. The burnable-poison coating may have a thermal expansion coefficient similar to that of the zirconium alloy to further enhance the adhesion to the zirconium alloy surface. One material having this characteristic is zirconium diboride.

As previously discussed, the required thickness of a boron-based burnable-poison coating will depend on the concentration of the boron-10 in the coating. For example, a ⅜-inch fuel rod will require a cladding tube having a naturally occuring zirconium diboride surface thickness between about 0.00004 and about 0.001 inches, and preferably about 0.0002 inches. If isotopically enriched zirconium diboride (having higher concentrations of boron-10) is used, the required coating thickness will be reduced. For example, since naturally occurring boron contains about 20% boron-10 and 80% boron-11, and since boron-10 has a thermal absorption cross-section several orders of magnitude greater than boron-11, isotopically purified boron-10 will provide approximately five times the performance of an equivalent amount of naturally occurring boron. Thus, a ⅜-inch fuel rod having a zirconium diboride surface which contains isotopically purified boron-10 will typically require a thickness between about 0.000008 and about 0.0002 inches, preferably about 0.00004 inches.

FIG. 1 illustrates a cross-sectional view of a fuel rod 10 having a burnable-poison coating which is made in accordance with an embodiment of the present invention. The fuel rod 10 includes tubular member 11. A burnable-poison coating 12, such as zirconium dioboride, is provided in a thin layer on the inside surface of the tubular member 11. For purposes of this disclosure, the combination of the tubular member 11 and poison coating 12 will be referred to as the cladding tube. A fuel pellet 13, such as uranium dioxide, is enclosed within the cladding tube.

The plasma-arc spray-head device for depositing the burnable-poison coating makes use of a weld head similar to that developed to weld sleeves to the inside of steel generator tubes. According to an embodiment of the present invention, the weld head is modified to perform the plasma-arc spraying of a fine ceramic or metal powder.

Figure 2:
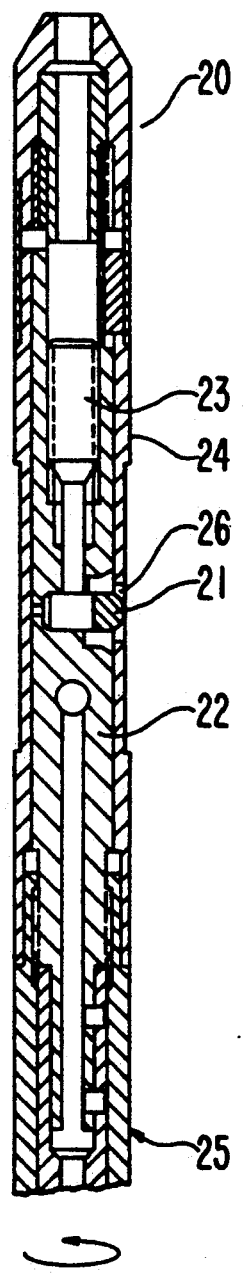
FIG. 2 is a plasma-arc spray-head device according to an embodiment of the present invention.

FIG. 2 illustrates an embodiment of the plasma-arc spray-head device 20 of the present invention. The plasma-arc spray-head device 20 includes an electrode 21 which is preferably tungsten. Electrical power is brought to the electrode 21 by means of a conductor 22 which extends, for example, through the center of the plasma-arc spray-head device 20. The conductor 22 may comprise copper or other conductive material and is preferably tubular. A set screw 23 may be used, for example, to clamp the electrode 21 in place against the conductor 22. A portion of the conductor 22 is contained within a ceramic housing 24 which acts as an effective thermal and electrical insulator. An aperture 26 is formed in the ceramic housing 24 in the vicinity of the electrode 21. The electrode 21 is disposed within the aperture 26 so that it extends outwardly to a first maximum radius. This first maximum radius is less than a second maximum radius which corresponds to the outermost radius of the plasma-arc spray-head device 20. This prevents the electrode 21 from directly contacting the inside surface of the tubular member 11 and helps maintain a constant spacing between the electrode 21 and tubular member 11. A spindle 25, which acts as the supporting portion of the plasma-arc spray-head device 20, may be rotated at its base by means of a motor and gearing (not shown). Alternatively, the tubular member may be rotated.

During operation, the plasma-arc spray-head device 20 is inserted into an appropriate tubular member 11. The tubular member 11 is preferably a zirconium alloy, with Zircaloy-2 and Zircaloy-4 being typical examples. An electrical arc is then established between the electrode 21 and the tubular member 11. At or near the same time, a burnable-poison-containing powder is introduced at the location of the electrical arc resulting in the deposition of a burnable-poison coating 12. The selected powder is provided by entraining the powder in an inert gas, preferably argon gas, and spraying the entrained powder into the cladding tube 11 in the vicinity of the arc between the electrode 21 and the tubular member 11.

The powder is selected to provide a boron-containing ceramic or metal burnable-poison coating 12 on the tubular member 11. The powder may be, for example, a metal boride such as a Group 11a boride, a transition-element boride, or aluminum boride, with zirconium diboride being preferred, or a ceramic boron-containing compound, with elemental boron, boron carbide, boron nitride and borosilicate glass being preferred. As previously stated, the boron compound is selected to provide a burnable poison layer which strongly adheres to the zirconium alloy cladding tube and preferably has a thermal expansion coefficient that closely matches that of the zirconium alloy. Other pertinent characteristics of the burnable poison layer include adequate corrosion resistance and melting point and, of course, thermal absorption cross-section.

During the deposition process, one end of the tubular member 11 is sealed to help provide an inert atmosphere for the plasma-arc spray-deposition process. Moreover, the plasma-arc spray-head device 20 is designed such that it is inserted into the opposite end of the tubular member 11 while providing a fairly tight tolerance between the plasma-arc head device 20 and the tubular member 11. By providing a continuous flow of argon gas in the vicinity of the electrode 21, the region of the electrode 21 can be effectively purged of undesirable atmospheric gases such as oxygen and nitrogen, and an inert blanket can be maintained in that region. If necessary seals, one-way valves, bubblers and so forth can be provided to ensure the integrity of the inert blanket.

The method for directing the entrained powder into the vicinity of the arc is selected to provide a high quality, uniform burnable-poison coating 12. For example, the entrained powder may be passed through the hollow conductor 22 and directed into the arc by means of grooves or small holes in the conductor 22 in the region of the electrode 21. Alternatively, the entrained powder may be introduced through the sealed end opposite the plasma-arc spray-head device 20, resulting in a continuous flow of the entrained powder down the length of the tubular member 11. Moreover, the entrained powder may be introduced using passageways (not shown) formed in the top of the plasma-arc spray-head device 20 above the electrode 21.

A pure argon gas atmosphere may be necessary to establish the plasma arc. In that event, pure argon gas can be initially introduced into the system. Once the arc is established, the entrained powder can be introduced into the system through the same passageway as that used to provide the pure argon gas. Alternatively, it may be desirable to bring the pure argon gas and the entrained powder from separate passageways.

To establish a uniform burnable-poison coating 12, the plasma-arc spray-head device 20 should be rotated with respect to the tubular member 11 as the powder is sprayed. Concurrently, the tubular member 11 should be gradually moved in an axial direction with respect to the plasma-arc spray-head device 20, further promoting the formation of a uniform burnable-poison coating 12 on the inside of the tubular member 11.

The length of the plasma-arc spray-head device 20 which enters the tubular member 11 may be up to 12 feet in length, but this length can be reduced if the plasma-arc spraying is performed from both ends of the tubular member 11.

It may be desirable to optimize several variables in the plasma-arc spraying process. In addition to the relative axial and rotational velocities between the plasma-arc spray-head device 20 and the tubular member 11, the mass flow rate of the entrained powder and the arc power between the electrode 21 and the tubular member 11 must be optimized. If the tubular member 11 is a zirconium alloy compound, the temperature of the tubular member 11 must be kept below about 600° F., while at the same time maintaining proper arc conditions to bond the burnable-poison coating 12 to the inside surface of the tubular member 11. Depending on the application, it may be necessary to cool the tubular member 11 to keep the temperature within the desired range.

Thus, it will be seen that the invention provides a fuel rod cladding tube having a plasma-arc-sprayed burnable-poison coating on the inside surface. This coating is provided by means of a plasma-arc spray-head device which makes use of an electrical arc to provide a plasma for depositing a burnable-absorber-containing powder.

I claim:

1. A nuclear, fuel cladding tube comprising a tubular member and a burnable-poison coating which has been applied to the inside surface of the tubular member by means of plasma arc spraying.

2. The nuclear fuel cladding tube of claim 1, wherein the tubular member comprises a zirconium alloy.

3. The nuclear fuel cladding tube of claim 2, wherein the burnable-poison coating is a boron-containing compound.

4. The nuclear fuel cladding tube of claim 3, wherein the boron-containing compound is a metal boride selected from the group consisting of Group 11a borides, transition-element borides and aluminum boride.

5. The nuclear fuel cladding tube of claim 4, wherein the metal boride is zirconium boride.

6. The nuclear fuel cladding tube of claim 3, where the boron-containing compound is a ceramic compound selected from the group consisting of elemental boron, boron carbide, boron nitride, and borosilicate glass.

7. The nuclear fuel cladding tube of claim 5, wherein the tubular member is about ⅜ inches in diameter and the burnable-poison coating ranges from about 0.00004 to about 0.001 inches in thickness.

8. The nuclear fuel cladding tube of claim 7, wherein the burnable-poison is about 0.0002 inches in thickness.

9. The nuclear fuel cladding tube of claim 3, wherein the boron-containing compound comprises isotopically purified boron-10.

10. The nuclear fuel cladding tube of claim 3, wherein the boron-containing compound is zirconium diboride comprising isotopically purified boron-10.

11. The nuclear fuel cladding tube of claim 10, wherein the tubular member is about ⅜ inches in diameter and the burnable-poison ranges from about 0.00008 to about 0.0002 inches in thickness.

12. The nuclear fuel cladding tube of claim 11, wherein the burnable poison is about 0.00004 inches in thickness.

13. A method for depositing a burnable-poison coating on an inner surface of a tubular member with an electrode spaced therefrom by a predetermined distance comprising the steps of:
applying an electrical potential across an inert atmosphere between the electrode and the tubular member such that an electrical arc is established between the electrode and an inner surface of the tubular member;
entraining a burnable-poison-containing powder in the inert atmosphere;
providing the entrained powder in the vicinity of the arc;
rotating the electrode with respect to the tubular member while maintaining the predetermined distance; and
axially moving the electrode with respect to the tubular member while maintaining the predetermined distance.

14. The method of claim 13, wherein the tubular member comprises a zirconium alloy.

15. The method of claim 14, wherein the burnable-poison-containing powder is selected from the group consisting of boron-containing ceramic and metal compounds.

16. The method of claim 14, wherein the burnable-poison-containing powder is a boron-containing ceramic compound selected from the group consisting of elemental boron, boron carbide, boron nitride, and borosilicate glass.

17. The method of claim 14, wherein the burnable-poison-containing powder is selected from the group consisting of ceramic and metal compounds containing isotopically enriched boron-10.

18. The method of claim 14, wherein the burnable-poison-containing powder is selected from the group consisting of Group 11a metal borides, transition-element borides and aluminum boride.

19. The method of claim 14, wherein the burnable-poison-containing powder is zirconium diboride.

20. The method of claim 13, wherein the inert atmosphere is selected from the group consisting of argon and helium.

21. A plasma-arc spray-head device for plasma-arc spraying a burnable-poison coating on the inside surface of a tubular member comprising:
an annular ceramic housing having an aperture;
an electrically conductive member disposed within the housing;
an electrode in electrical contact with the electrically conductive member, the electrode being disposed such that it projects into the aperture in the ceramic housing and extends outwardly to a first maximum radius which is less than a second maximum radius corresponding to the outermost radial extent of the plasma-arc spray-head device; and
means for supplying a gaseous composition to the vicinity of the electrode.

22. The device of claim 21, further comprising means for axially and longitudinally moving the electrode with respect to the stationary tubular member.

23. The device of claim 21, wherein the electrode is a tungsten electrode.

24. The device of claim 21, wherein the electrically conductive member is a copper tube.

25. The device of claim 24, wherein the supplying means comprises the interior of the copper tube and apertures formed in the copper tube in the vicinity of the electrode.

* * * * *

UNITED STATES PATENT AND TRADEMARK OFFICE
CERTIFICATE OF CORRECTION

PATENT NO. : 5,280,504
DATED : January 18, 1994
INVENTOR(S) : RICHARD H. YOUNG

It is certified that error appears in the above-identified patent and that said Letters Patent is hereby corrected as shown below:

Column 4, line 1, "(Bn)" should read --($B^{11}$)--;

Column 4, line 11, "$B^{11}$) should read --$B^{10}$--;

Column 5, line 41, "tube I1" should read --tube 11--;

Column 5, line 47, "Group 11a" should read --Group IIa--;

Column 6, line 54, "member I1" should read --member 11--;

Column 7, line 6, (claim 4, line 3), "Group 11a" should read --Group IIa--;

Column 7, line 28, (claim 4, line 3), "0.00008" should read --0.000008--;

Column 8, line 18, (claim 18, line 3), "Group 11a" should read --Group IIa--

Signed and Sealed this

Sixteenth Day of August, 1994

Attest:

BRUCE LEHMAN

Attesting Officer   Commissioner of Patents and Trademarks